(12) United States Patent
Graus et al.

(10) Patent No.: US 6,427,846 B1
(45) Date of Patent: Aug. 6, 2002

(54) PLASTIC FILTRATION UNIT BONDED BY AN L-SHAPED PLASTIC MELT

(75) Inventors: Andreas Graus, Nörten-Hardenberg; Christian Schäfer, Uslar; Michael Schützler, Rosdorf, all of (DE)

(73) Assignee: Vivascience AG, Hannover (DE)

(*) Notice: Subject to any disclaimer, the term of this patent is extended or adjusted under 35 U.S.C. 154(b) by 0 days.

(21) Appl. No.: 09/479,385

(22) Filed: Jan. 6, 2000

(30) Foreign Application Priority Data

Jul. 31, 1997 (DE) .......................... 197 33 021

(51) Int. Cl.[7] .................. B01D 29/05; B01D 27/08; B01D 29/15

(52) U.S. Cl. .................. 210/445; 210/446; 210/453; 210/454; 210/455; 210/321.61; 210/321.75; 210/321.84

(58) Field of Search .................. 210/445–446, 210/455, 450, 451, 321.61, 321.75, 321.84, 453–454

(56) References Cited

U.S. PATENT DOCUMENTS

| | | | | |
|---|---|---|---|---|
| 3,730,351 A | * | 5/1973 | Veronesi | |
| 3,782,083 A | | 1/1974 | Rosenberg | |
| 3,954,625 A | * | 5/1976 | Michalski | 210/445 |
| 4,113,627 A | * | 9/1978 | Leason | 210/446 |
| 5,688,460 A | * | 11/1997 | Ruschke | |
| 5,723,047 A | * | 3/1998 | Turnbull | 210/445 |
| 5,938,940 A | * | 8/1999 | Zuk, Jr. | 210/767 |
| 5,965,019 A | * | 10/1999 | Olsen et al. | 210/331 |
| 6,030,539 A | * | 2/2000 | Zuk, Jr. | 210/767 |

FOREIGN PATENT DOCUMENTS

| | | |
|---|---|---|
| EP | 0 118 601 A1 | 9/1984 |
| EP | 0 325 712 A1 | 8/1989 |

* cited by examiner

Primary Examiner—Matthew O. Savage
Assistant Examiner—Marianne S. Ocampo
(74) Attorney, Agent, or Firm—Cheroff, Vilhaver, McClung & Stenzel, LLP

(57) ABSTRACT

An improvement in the fabrication and bonding of dead-end and cross-flow thermoplastic filtration modules is disclosed whereby two housing parts are bonded to each other and to a filtration membrane by an L-shaped plastic melt.

5 Claims, 3 Drawing Sheets

PLASTIC FILTRATION UNIT BONDED BY AN L-SHAPED PLASTIC MELT

Pursuant to 35 USC §§365(c) and 120, the priority of PCT/EP 98/046855 filed Jul. 25, 1998 and German Application No. DE 197 33 021.5 filed Jul. 31, 1997 is claimed.

BACKGROUND OF THE INVENTION

The invention is concerned with a fluid filtration unit constructed of thermoplastic polymer the unit having a filtration element within a two-part housing. Such filtration units are predominately employed in laboratories and in medical technologies, being known as dead-end or crossflow-filtration units, generally used for the filtration of liquids and gases as well as for sterile filtration. As a rule, they are operated as relatively small disposable units, for instance as an accessory for hypodermic injection or as a concentration tool in biological and genetic laboratories. Such filtration elements, when equipped with membrane adsorbers, facilitate the removal of contaminating materials or the recovery of valuable substances appearing only in small concentrations.

U.S. Pat. No. 3,782,083 describes a rotationally symmetric disposable gas filter formed from a two-part housing, wherein the two housing parts enclose a fluid-tight flat filtration membrane with a fluid inlet and outlet with interior inlet and outlet spaces. The housing parts are so designed in the peripheral edge area, that upon being pressed against one another, they snap together in a compression-type fit. When this is done, the filtration membrane is pressed against a concentric, projecting mounting member of one part of the housing and by melting the mounting member, the two parts of the housing are bonded together in a fluid-tight manner. When this occurs, the melt flows into the pores of the filtration membrane. A drawback to this design is that permeation of the melt into the pores of the membrane is often damaging to the membrane and to its filtration characteristics. The membrane becomes brittle in its periphery from the melt which permeates through it or, in the case of hydrophilic membranes, a case of so-called edge hydrophobicity occurs. A further disadvantage is that, because of the weakening of the membrane, filtration pressure differences greater than 3 bar cannot be withstood. One remedy proposed is the installation of an encapsulating, pressure-resistant enclosure of the outer edges of the housing parts applied in a spray along the periphery of the membrane, in accord with EP 0 325 712 A1; but this entails additional material and labor costs.

EP 0 118 601 B1 teaches edge hydrophobicity in hydrophilic membranes may be avoided if the surface of the hydrophilic membranes are so bound to the housing parts by plastic welding that the liquified, melted plastic does not permeate the membrane filter material. The disadvantage of this is that in the case of pressure differences of more than 3 bar, the housing may become so deformed that the surface connection becomes unsealed and the filtration unit must be discarded.

Thus, the present invention has the object of creating a filtration unit from a two-part plastic housing, which is capable of filtration of fluids with pressure differentials up to 10 bar and wherein the filtration element is so bound to the housing, that none of the foregoing disadvantages of the prior art occur. An additional object lies in the creation of a simple inexpensive procedure for the manufacture of the filtration unit so that it is justifiably treated as disposable.

BRIEF SUMMARY OF THE INVENTION

The foregoing objects and advantages are achieved by the provision of a filtration unit with a filtration element situated in a housing of two interconnecting, mutually bonded parts and the housing is so divided into inlet and outlet sides by housing plenums with fluid connection fittings, that the feed side of the filtration element is proximal to the inlet plenum and its permeate is proximal to the outlet plenum. Further, the peripheral edge surface of the feed side of the filtration element is bonded fluid-tight with the first housing part, while the peripheral edge surface of the permeate side of the filtration element is pressed against a closed, peripherally running, flanged area of the second housing part. In a second aspect, the present invention provides a method of making the inventive filtration unit. Surprisingly, it has been discovered that the inventive filtration unit possesses excellent structural strength and is capable of filtration of fluids with pressure differentials of up to 10 bar.

BRIEF DESCRIPTION OF PREFERRED EMBODIMENTS

Such strength, ease of construction and high pressure capacity are possible when all connections are comprised of a single cured L-shaped plastic melt, formed by melting a portion of the plastic of at least one of the housing parts. More specifically, one leg of the L-shaped plastic melt binds both housing halves pressure-tight while the other leg binds the feed side of the edge of the filtration element fluid-tight with the first housing part.

The L-shaped plastic melt connection is formed by melting a portion of the plastic in the inner edge area of the wall of the second housing part, the inner width or diameter of which is less than that of the outer width or diameter of the housing wall of the first housing part, and then pressing both housing parts together while the melt is still in a molten or plastic state, which in turn shears off a portion of the still molten wall of the second housing part and at the same time deposits the sheared portion on the periphery of the feed side of the filtration element. Continued pressing of the two housing parts together causes the sheared-off molten portion to be sandwiched between the base of the wall of the first housing part and the edge surface of the feed side of the filtration element. The melt is conducted conventionally, for example, by heat radiation, friction welding, ultrasonic welding by or by laser welding.

Figure 4:
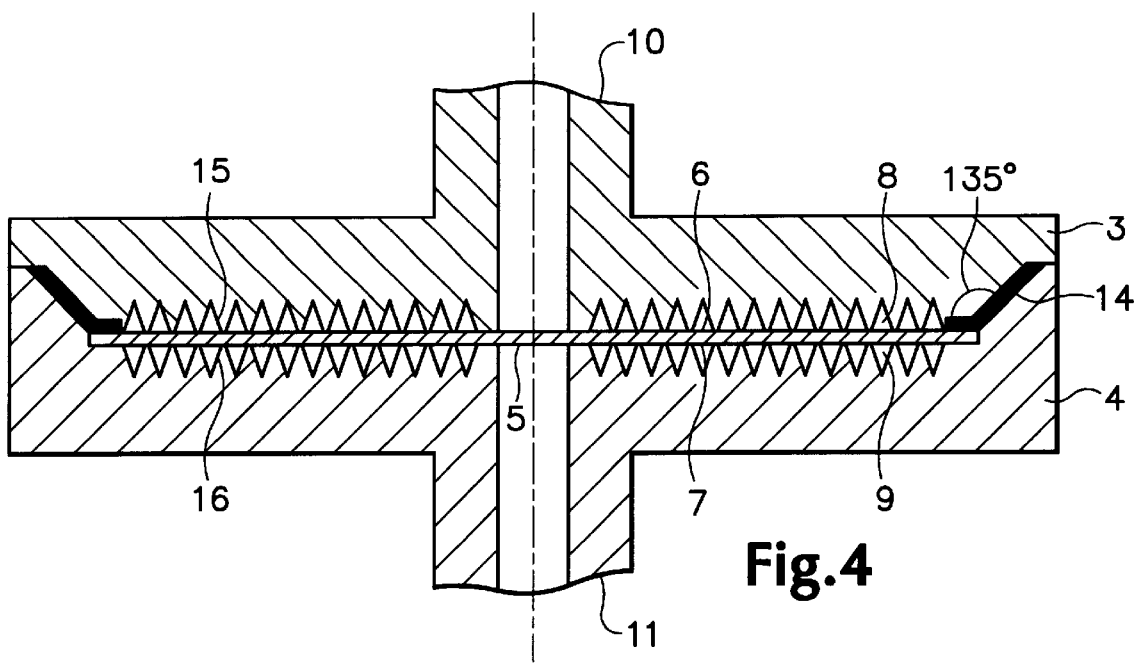
FIG. 4 is a schematic cross-section through an exemplary crossflow filtration unit illustrating a variation of the joining of the first and second parts of the housing.

The two legs of the L-shaped plastic melt should be at an angle of 90° to less than 180°, preferably 90° to 135°, to one another. In a most preferred embodiment, an angle greater than 90° is possible when one wall of one housing part is correspondingly slanted toward the other wall of the other housing part, best seen in FIG. 4.

The filtration element consists of at least one layer of a porous filtration membrane. In the case of membrane adsorbers, it may be desirable to use several layers to form a stack in order to achieve an increase in adsorption capacity. When this is done, the surface of the filtration element edge of the first layer is bound to one leg of the L-shaped, cured plastic melt, while the remainder of the layers are embedded along their periphery by the cured plastic, whereby adequate sealing is assured. The porous filtration membrane can also be supported or reinforced, for instance, by being an integral or a laminated, textile-reinforced membrane. The porous filtration membrane can also be overlaid on another reinforced membrane or on a woven fiber backing. The filtration membrane can also consist of at least one layer of non-woven fiber membrane. The term "porous membranes" is meant to include ultrafiltration and microfiltration membranes.

In an especially preferred embodiment of the invention, the filtration element is supported. All known types of filter supports can be used, on one or both sides. They can be designed to cause a specified fluid flow direction. For filtration units operated in crossflow mode, filter supports with guides can be used on the feed side for directing the exit flow of the retentate fluid, and which advantageously results in a parallel, wave-shaped, spiral-shaped or meandering flow over the surface of the filtration element. In dead-end filtration, the filter support is so chosen that a favorable inflow and outflow of the fluid to and from the surface of the filtration element is assured by optimal mechanical support and protective functions. More advantageously, the filter support is incorporated into a recess of the base of the housing part, wherein the recess is approximately the width of the filter support. The filtration units may be made in any shape, although rotationally symmetric arrangement is preferred for dead-end filtration. In the case of crossflow filtration units, a rectangular shape is preferred.

To fabricate the filtration units of the invention, the filtration element is first inserted into the second housing part and aligned with and affixed to the closed, peripheral surface area that engages the filtration element so as to center it within the housing. This step may be accomplished, for example, by applying a vacuum under the inserted filtration element or by the application of gas pressure from above. If the filtration element is not so aligned and affixed there is a risk that the shearing and redeposit of the melt will push the filtration element at least partially out of its centered position which would cause leakage or at least insufficient covering by the melt at individual places on its feed side.

Figure 1:
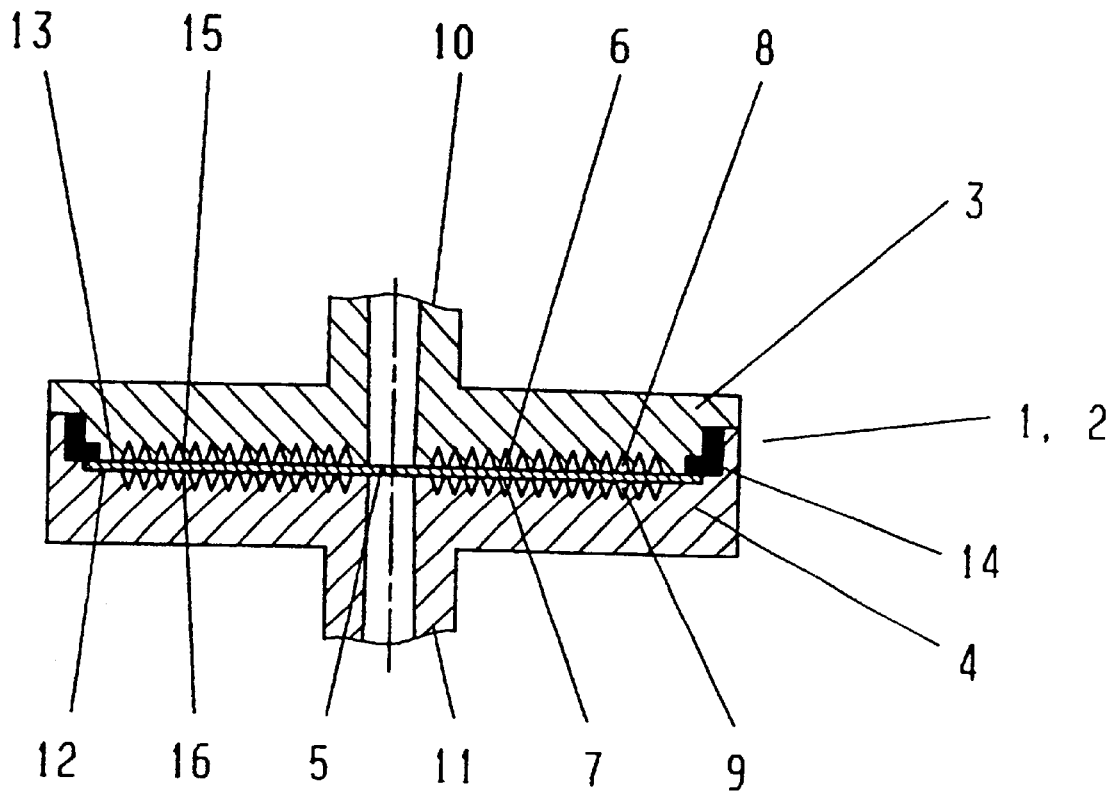
FIG. 1 is a schematic cross-section through an exemplary dead-end filtration unit of the present invention.

As seen in FIG. 1, the filtration unit 1 consists of a housing 2 which has a first part 3 and a second part 4, which parts interconnect with and are bonded at their respective peripheral housing walls. The two housing parts hold a filtration element 5 with a feed side 6 and permeate side 7, by its peripheral edge, so that the housing is divided into an inlet plenum 8 and an outlet plenum 9. The inlet plenum 8 is provided with an inlet fluid fitting 10 for the fluid to be filtered. The outlet plenum 9 is similarly provided with a filtrate fluid outlet fitting 11.

The second housing part 4 has a peripheral support surface 12 to which the filtration element 5 is affixed, and against which the permeate side 7 of the edge of element 5 is pressed. The edge surface of the feed side 6 of the filtration element is clamped fluid-tight by a closed peripheral shoulder 13 on the base of the first housing part 3. The L-shaped melt 14 provides a fluid-tight connection between the interconnecting side walls of the housing parts 3 and 4. L-shaped melt 14 also provides a snug connection between the closed peripheral shoulder 13 of the base of the first housing part 3 and the surface of the feed side 6 of the edge filter of filtration element 5. These sealed, tight connections are due to the single, cured L-shaped plastic melt 14. The filtration element 5 is supported on both sides by filtration element supports 15 and 16.

Figure 2:
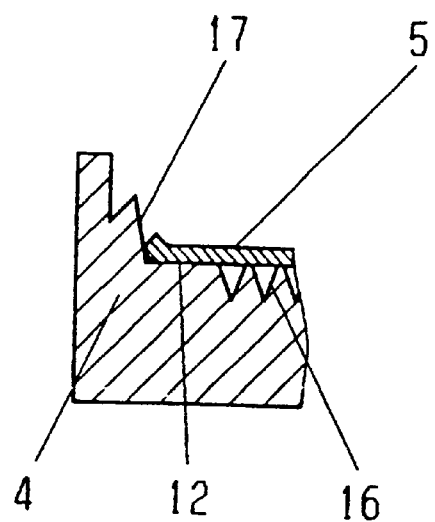
FIG. 2 is a schematic cross-section through a part of the second housing part of a preferred embodiment of the invention

FIG. 2 schematically depicts a cross-sectional view through a portion of the second housing part 4 of a preferred embodiment of the invention, in which the peripheral side wall 17 is slanted so as to make an angle which is greater than 90° but less than 180° between the legs of the L-shaped plastic melt 14.

Figure 3:
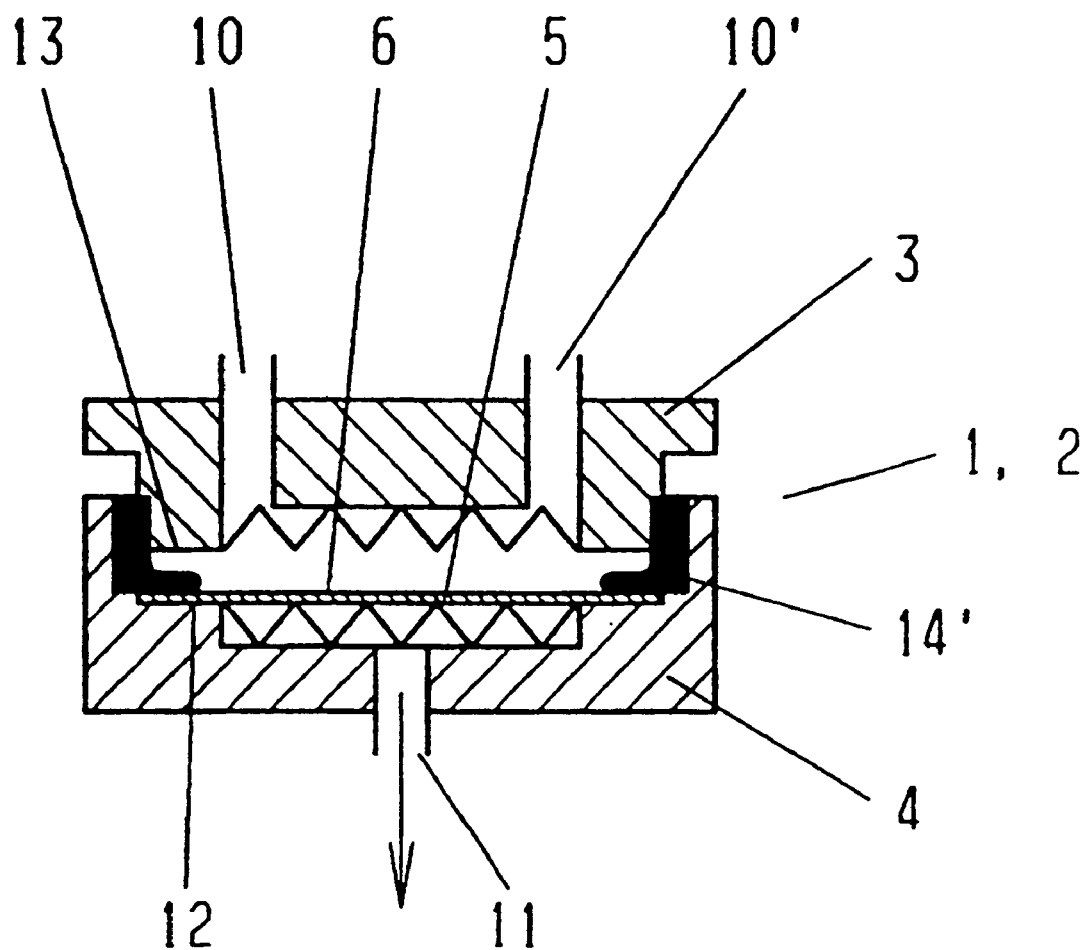
FIG. 3 is a schematic cross-section through an exemplary crossflow filtration unit illustrating the joining of the first and second parts of the housing.

FIG. 3 schematically depicts a cross-sectional view through a crossflow filtration unit during the assembly of the two housing parts. In addition to the same elements present in the dead-end filtration unit depicted in FIG. 1, there is an additional fluid connection 10' for the outflow of retentate.

The filtration unit of the present invention is manufactured by carrying out the following steps, generally illustrated in FIG. 3:

introducing filtration element 5 into second housing part 4 and affixing it onto the closed, peripheral support surface 12; the affixing preferably takes place by the application of a greater gas pressure on one side of element 5 than on its other side, e.g., by applying a vacuum on the fluid outlet fitting 11, indicated by the arrow;

selectively melting a portion 14' of the plastic of the inner peripheral area of the housing wall of the second housing part 4, the inner width or diameter of which is somewhat less than the outside width or diameter of the housing wall of the first housing part 3;

sliding the two housing parts 3 and 4 into one another, whereby a portion of the now-molten inner wall is sheared from the housing wall of second part 4 and rolls down between the base of the housing wall of first housing part 3 and the peripheral edge surface of the feed side 6 of the filtration element 5; and a pressing together the two housing parts 3 and 4 and letting the melt cool, whereby a single cured L-shaped plastic melt sealing connection 14' is made between the housing parts 3 and 4 and the periphery of the feed side 6 of filtration element 5.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a fluid filtration unit comprising:

(a) thermoplastic first (3) and second (4) housing parts matingly engageable with each other and provided with a fluid inlet (10) and with at least one fluid outlet;

(b) said first housing part (3) having a peripheral shoulder (13) on its base; and (c) a filtration element (5) having a feed side with a peripheral surface and a periphery and secured within and to said housing parts and in fluid communication with said fluid inlet and said at least one fluid outlet;

the improvement comprising bonding means for bonding said housing parts and said filtration element together, said bonding means comprising a single L-shaped plastic melt (14) having a first leg and a second leg between said housing parts and along the periphery of said filtration element wherein said first leg of said L-shaped plastic melt binds said first and second housing parts (3, 4) together and said second leg binds the peripheral surface of said feed side of said filtration element (5) fluid-tight only to said peripheral shoulder ( 3) of said first housing part (3).

2. The filtration unit of claim 1 wherein the legs of said L-shaped plastic melt are at approximately right angles to one another.

3. The filtration unit of claim 2 wherein the legs of said L-shaped plastic melt are at an angle to one another that is greater than 90° and less than 180°.

4. The filtration unit of claim 3 wherein said angle is approximately 135°.

5. The filtration unit of any of claims 1 to 4 wherein said filtration element is selected from the group consisting of at least one layer of a porous membrane, a non-woven fiber membrane, a porous supported membrane, a porous reinforced membrane, a membrane adsorber and combinations thereof.

* * * * *

UNITED STATES PATENT AND TRADEMARK OFFICE
CERTIFICATE OF CORRECTION

PATENT NO. : 6,427,846 B1
DATED : August 6, 2002
INVENTOR(S) : Graus et al.

It is certified that error appears in the above-identified patent and that said Letters Patent is hereby corrected as shown below:

Column 2,
Line 24, insert a period after "invention".

Column 4,
Line 38, delete "a" before "pressing together"

Column 5,
Line 4, change "(3)" first occurrence to -- (13) --.

Signed and Sealed this

Eleventh Day of January, 2005

JON W. DUDAS
*Director of the United States Patent and Trademark Office*